United States Patent [19]

Korom

[11] 4,284,603

[45] Aug. 18, 1981

[54] TEST TUBE DECANTER RACK

[75] Inventor: Gordon K. Korom, Grayslake, Ill.

[73] Assignee: Abbott Laboratories, North Chicago, Ill.

[21] Appl. No.: 147,882

[22] Filed: May 8, 1980

[51] Int. Cl.³ .......................... B01L 9/06; B01D 35/02

[52] U.S. Cl. .................................. 422/101; 210/323.1; 210/473; 211/74; 422/69; 422/71

[58] Field of Search ...................... 23/230 B, 915, 920; 422/69, 71, 99, 102, 101, 104; 211/74; 210/323 R, 473, 482, 323.1

[56] References Cited

U.S. PATENT DOCUMENTS

| | | | |
|---|---|---|---|
| 3,480,152 | 11/1969 | Walsh | 211/74 |
| 3,643,812 | 2/1972 | Mander et al. | 211/74 |
| 3,871,832 | 3/1975 | Leblanc | 422/104 |
| 4,040,234 | 8/1977 | Stockdale et al. | 422/104 X |

FOREIGN PATENT DOCUMENTS

| | | | |
|---|---|---|---|
| 2404466 | 4/1979 | France | 23/915 |

*Primary Examiner*—Arnold Turk

*Attorney, Agent, or Firm*—John J. McDonnell

[57] ABSTRACT

An apparatus useful in expediting the performance of immunochemical determinations which require the complete separation of a solid phase or precipitate from a liquid phase is disclosed. In particular, this apparatus features a test tube rack and cooperating retaining means for spanning said rack and tubes whereby inversion results in a rapid and uniform removal of the liquid contents of each tube while retaining the precipitate or solid phase.

6 Claims, 4 Drawing Figures

TEST TUBE DECANTER RACK

BACKGROUND OF THE INVENTION

1. Field Of The Invention

In a typical immunochemical assay, a solid phase (plastic bead or the like) coated with an immunoreactant such as an antibody or antigen is added to a sample possibly containing the complimentary antibody or antigen to be assayed. If present, the immunoreactant in the sample will react with the affixed immunoreactant and thereby adhere to the solid support. A reagent containing a known quantity of one of the immunoreactants which has been labeled with a detectable member such as an enzyme, radioisotope or fluorescent moiety can then be added to react with one of the immunoreactants on the solid support. The solid support can then be separated from the reaction medium and examined to determine the presence or absence of labeled reagent.

The simple separation of the solid phase from the reaction medium can be accomplished in a number of ways. One method involves aspirating the liquid phase from the reaction vessel, another involves carefully decanting the liquid and still another involves using a reaction container with a crimped or constricted orifice to retain the solid phase while allowing the liquid phase to be poured off.

Each of the foregoing methods of decantation involves handling the reaction containers or test tubes individually, and at the very least, the established procedures are time consuming.

The present invention has solved the problems involved in performing a routine task on a large number of samples. More particularly, the claimed apparatus simplifies and expedites the performance of immunochemical determinations by facilitating the separation of a solid phase or precipitate from a liquid phase.

Using the claimed apparatus, the reaction vials or test tubes are vertically aligned in the test-tube holder in the conventional manner. Thus arrayed, tops of the tubes are covered with a retaining means having a perimeter which engages with the sides of the test tube rack. The entire apparatus is inverted and the liquid contents are removed from the tubes and the solid phase is retained. The apparatus is returned to the up-right position and the solid phase may then be examined for the presence of the labeled reagent.

It should be apparent that this apparatus permits the decantation of an entire rack of tubes simultaneously. Furthermore, note that the liquid phase can be uniformly removed. This cannot be assured where each tube is individually aspirated. The chances of misplacing an individual tube are also eliminated. A misplaced assay means lost time, money and perhaps even erroneous results due to confusion or changes in the immunoreactants which may occur during time spent looking for the tube.

2. Description Of The Prior Art

The results of a recent patentability search disclosed a variety of references describing test tube racks, but none could be found to describe or even suggest the claimed combination.

In particular, U.S. Pat. No. 3,643,812 to Mander, et al discloses a storage rack for test tubes having a cover attachable to the walls of the rack, but it appears to be primarlily for support and not to decant the liquid from the test tube.

U.S. Pat. No. 3,480,152 to Walsh describes a storage rack for vessels which are to be inverted to minimize exposure of the contents to air. The only similarity to the present invention is that the tubes and rack are inverted during the decantation procedure.

U.S. Pat. Nos. 1,188,146 and 4,124,122 both describe test tube racks structurally similar to part of the claimed apparatus, but again, neither describes any structure suitable for selectively decanting the liquid contents of the tubes.

SUMMARY OF THE INVENTION

Generally, this invention relates to a laboratory apparatus which is useful both as a test tube rack and as a device for decanting the liquid contents of tubes held by the rack.

Essentially, the apparatus comprises a top portion having a horizontal plate with a plurality of apertures; a middle portion also having a horizontal plate with a plurality of apertures; a bottom portion having a horizontal plate with a plurality of depressions to provide seats for the bottoms of said test tubes; a pair of sidewalls which are operatively associated with said top and middle portions so as to vertically align the apertures and depressions; and a retaining means spanning said top portion having a marginal end portion extending around and engaging with said sidewalls.

DESCRIPTION OF THE PREFERRED EMBODIMENT

Figure 1:
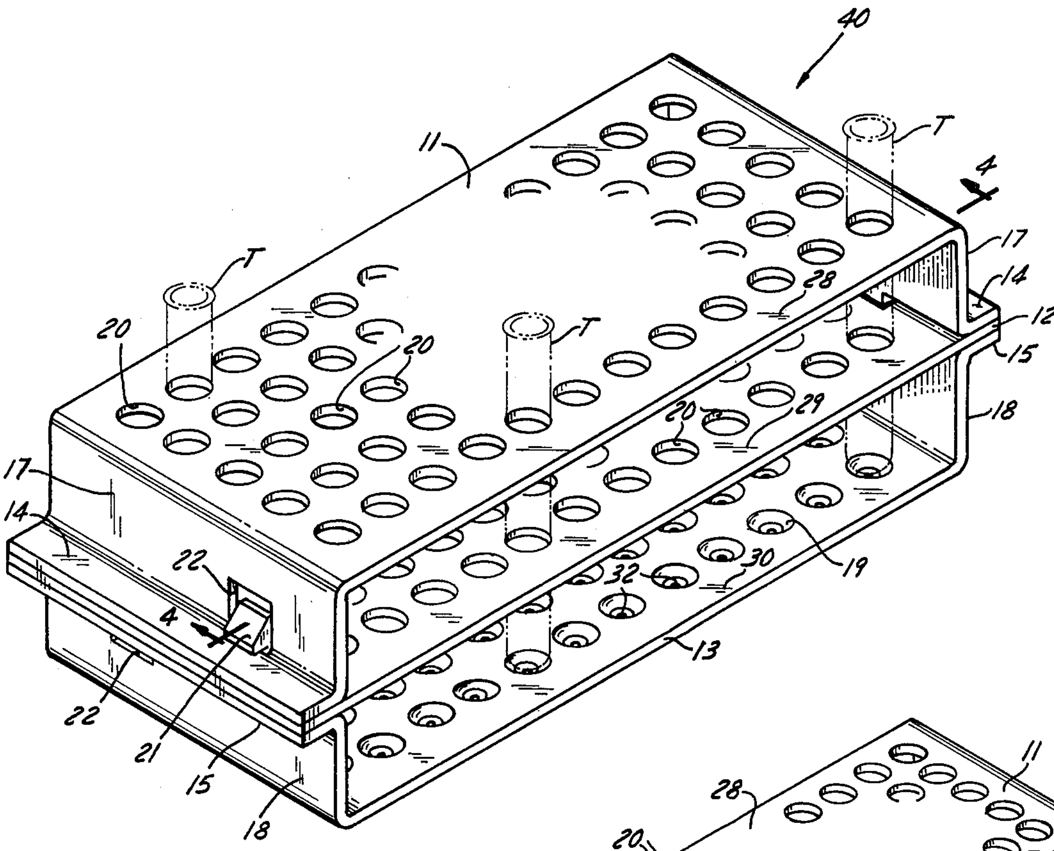
FIG. 1 is an isometric view of the test tube rack as viewed from the upper-left corner.
Figure 2:
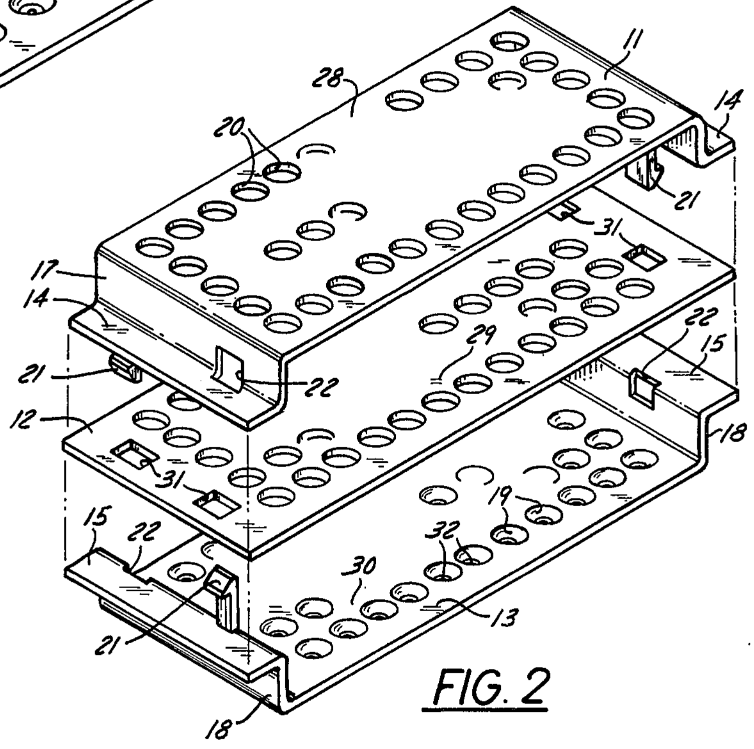
FIG. 2 is an exploded, reduced view of the test tube rack as depicted in FIG. 1.

Referring to the drawings in detail, wherein the numerals indicate like elements, there is shown in FIG. 1 an isometric view of the test tube rack 40 deemed particularly suitable for use in the claimed apparatus. The assembled rack comprises a top portion 11 having a horizontal plate 28 with a plurality of apertures 20. The apertures 20, of course, are of a size suitable to accommodate the test tubes T. The rack also features a middle portion 12 also having a horizontal plate 29 and a plurality of apertures 20 of a size and number conveniently equal to those of the top portion 11. A bottom portion 13 also has a horizontal plate 30 with a plurality of depressions 19 to provide seats for the bottoms of the test tubes. It has been found to be somewhat preferable to drill small holes 32 through the depressions 19 in the horizontal plate 30 of the bottom portion 13 to prevent the accumulation of water, but of course, said holes 32 are not essential to the function of the apparatus.

It has also proved advantageous to fabricate the top 11 and bottom 13 portions so that one would have a downwardly extending vertical sidewall 17 and the other an upwardly extending vertical sidewall 18. Furthermore, it is also desirable to provide the top portion 11 with a pair of upper flanges 14 and the bottom portion with a pair of bottom flanges 15. If these desirable features are adopted, the top and bottom portions can be produced from the same mold and the sidewalls can cooperate to form the sidewalls of the rack. Additionally, the upper and bottom flanges 14, 15 provide a convenient means for connecting the top 11, middle 12 and bottom 13 portions.

The three portions of the rack may be secured with glue or hardware, but a latching mechanism comprising a latching tongue 21 and a latching notch 22 has proved to be quite satisfactory. For example, both top and bottom portions can be molded to feature paired latching tongues 21, and paired latching notches 22, situated at opposite corners and cooperating with each other in a latching relationship. These latching elements, in conjunction with appropriate slots 31 in the middle portion, will secure all three portions of the rack. Furthermore, by thoughtful placement of the notches 22 and tongues 21, the top and bottom portions can still be made from the same mold. The elements of the rack 40 are preferably fabricated from a variety of suitable plastics such as polyethylene, polypropylene or polystyrene. These materials are relatively unbreakable and unreactive to the solutions employed in the various assays.

Figure 3:
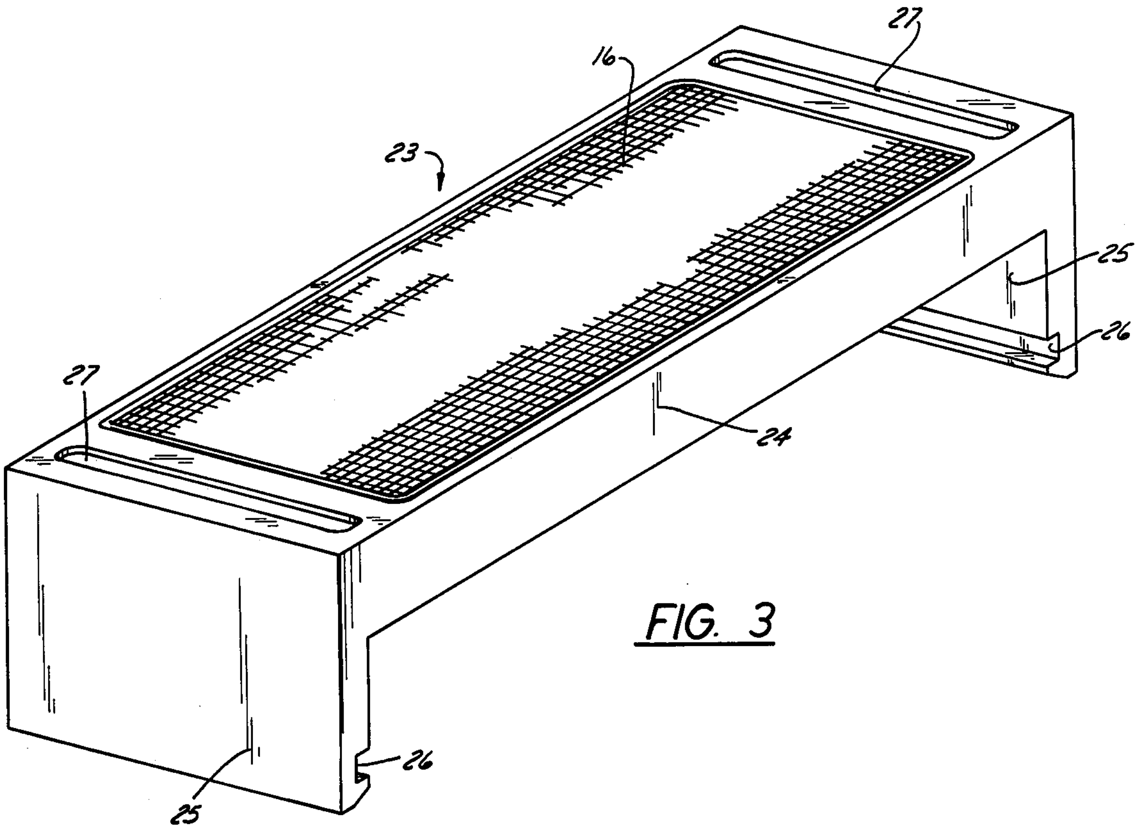
FIG. 3 is an isometric view of the retaining means as viewed from the upper-left corner.
Figure 4:
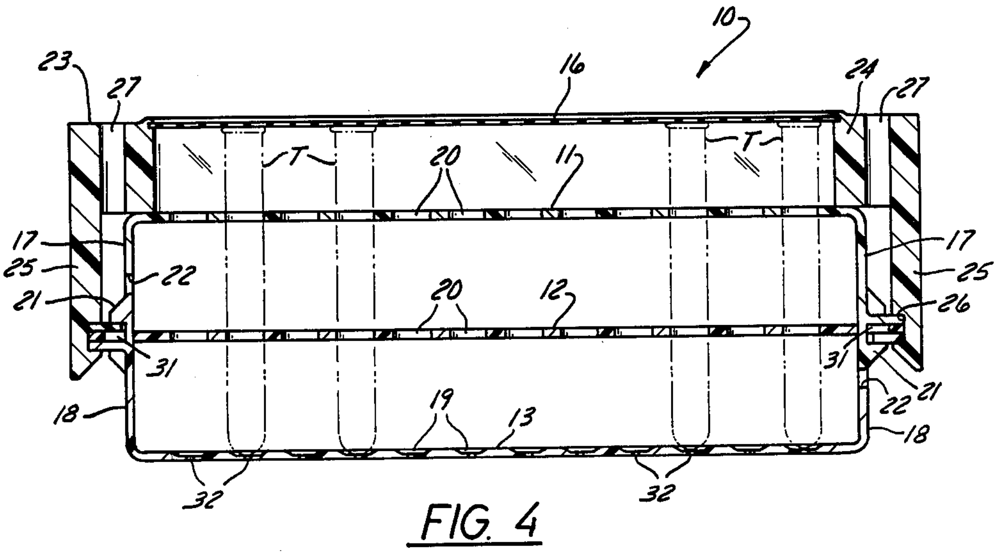
FIG. 4 is a cross-sectional view of the assembled apparatus taken along line 4—4 in FIG. 1 but including the retaining device of FIG. 3.

FIG. 3 presents an isometric view of a suitable retaining means 23 which can be fabricated from a variety of materials, but a plastic, nylon or fiberglass screen 16 would be more suitable than metal because of the likelihood of corrosion and glass would be less than desirable for fear of breakage. The retaining means 23 comprises a screen 16 and a frame 24 which features a pair of marginal ends 25 for engaging and cooperating with the sidewalls 17, 18 of the rack 40. An additional refinement would be to provide channels 26 in the marginal ends 25 to accommodate the projection resulting from the cooperation of the upper flanges 14 and bottom flanges 15 with the horizontal plate 29 of the middle portion 12. Although convenient, it is not necessary that the retaining means engage the test tube rack 40 in a snap-lock relationship. The apparatus would be just as functional if the retaining means 23 were to cooperate with the sidewalls 17, 18 of the test tube rack 40 with a snug or friction fit. It is only necessary that the retaining means 23 and test tube rack 40 cooperate when jointly manipulated and inverted.

Having described the invention by way of typical structural embodiments and mindful that modifications thereof will be apparent to those skilled in the art, what is claimed is as follows:

1. A laboratory apparatus which permits simultaneous decantation of the liquid contents of a plurality of vertically aligned test tubes which comprises:

a top portion having a horizontal plate with a plurality of apertures;

a middle portion having a horizontal plate with a plurality of apertures;

a bottom portion having a horizontal plate with a plurality of depressions to provide seats for the bottoms of test tubes;

a pair of sidewalls which are operatively associated with said top, bottom and middle portions so as to vertically align the apertures and depressions;

and a porous retaining means constructed and arranged to span said top portion so as to retain test tubes in an inverted rack while permitting decantation of liquid contents of said tubes while retaining a solid phase within the tube and having marginal end portions extending around and engaging with said sidewalls.

2. A laboratory apparatus which permits simultaneous decantation of the liquid contents of a plurality of vertically aligned test tubes which comprises:

a top portion having a horizontal plate with a plurality of apertures and a pair of downwardly extending vertical sidewalls;

a middle portion having a horizontal plate with a plurality of apertures;

a bottom portion having a horizontal plate with a plurality of depressions to provide seats for the bottoms of test tubes, and a pair of upwardly extending sidewalls which are operatively associated with said top and middle portions so as to vertically align the apertures and depressions;

and a porous retaining means constructed and arranged to span said top portion so as to retain test tubes in an inverted rack while permitting decantation of liquid contents of said tubes while retaining a solid phase within the tube and having marginal end portions extending around and engaging with said sidewalls.

3. A laboratory apparatus which permits simultaneous decantation of the liquid contents of a plurality of vertically aligned test tubes which comprises:

a top portion having a horizontal plate with a plurality of apertures and a pair of downwardly extending vertical sidewalls which terminate in outwardly extending flanges;

a middle portion having a horizontal plate with a plurality of apertures;

a bottom portion having a horizontal plate with a plurality of depressions to provide seats for the bottoms of test tubes, and a pair of upwardly extending sidewalls which terminate in outwardly extending flanges which are operatively associated with said top portion flanges and said middle portion so as to vertically align the apertures and depressions;

and a porous retaining means constructed and arranged to span said top portion so as to retain test tubes in an inverted rack while permitting decantation of liquid contents of said tubes while retaining a solid phase within the tube and having marginal end portions extending around and engaging with said sidewalls.

4. The laboratory apparatus of claim 3 wherein the top, middle and bottom portions are secured by a latch means.

5. The laboratory apparatus of claim 3 wherein the plurality of depressions are perforated to prevent the accumulation fluid.

6. The laboratory apparatus of claim 3 wherein the porous retaining means is a screen.

* * * * *